US010891476B2

(12) United States Patent
Wang et al.

(10) Patent No.: US 10,891,476 B2
(45) Date of Patent: Jan. 12, 2021

(54) METHOD, SYSTEM, AND NEURAL NETWORK FOR IDENTIFYING DIRECTION OF A DOCUMENT

(71) Applicant: Fujitsu Limited, Kawasaki (JP)

(72) Inventors: Ruochen Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 545 days.

(21) Appl. No.: 15/876,334

(22) Filed: Jan. 22, 2018

(65) Prior Publication Data

US 2018/0211109 A1    Jul. 26, 2018

(30) Foreign Application Priority Data

Jan. 24, 2017   (CN) .......................... 2017 1 0060219

(51) Int. Cl.
| G06K 9/00 | (2006.01) |
| G06N 3/08 | (2006.01) |
| G06K 9/62 | (2006.01) |
| G06K 9/32 | (2006.01) |
| G06N 3/04 | (2006.01) |

(52) U.S. Cl.
CPC ..... *G06K 9/00469* (2013.01); *G06K 9/00442* (2013.01); *G06K 9/3208* (2013.01); *G06K 9/6267* (2013.01); *G06N 3/0454* (2013.01); *G06N 3/08* (2013.01); *G06K 9/00456* (2013.01); *G06N 3/0481* (2013.01)

(58) Field of Classification Search
None
See application file for complete search history.

(56) References Cited

U.S. PATENT DOCUMENTS

| 5,276,742 | A | * | 1/1994 | Dasari | ................ | G06K 9/3208 |
| | | | | | | 345/658 |
| 5,960,229 | A | * | 9/1999 | Fukuoka | ............ | H04N 1/00681 |
| | | | | | | 399/17 |
| 6,151,423 | A | * | 11/2000 | Melen | ................ | G06K 9/3208 |
| | | | | | | 382/289 |

* cited by examiner

*Primary Examiner* — Chan S Park
*Assistant Examiner* — Elisa M Rice
(74) *Attorney, Agent, or Firm* — Staas & Halsey LLP (57) ABSTRACT

A method, system, and neural network for identifying direction of a document where the method comprises: extracting a text line in the document; calculating a first normal direction result indicative of the text line probably being in a normal direction and a first upside-down direction result indicative of the text line probably being in a direction upside-down with respect to the normal direction; calculating a second normal direction result indicative of the text line after being rotated by 180 degrees probably being in the normal direction and a second upside-down direction result indicative of the text line after being rotated by 180 degrees probably being in the direction upside-down with respect to the normal direction; and determining the direction of the document according to the first normal direction result, the first upside-down direction result, the second normal direction result and the second upside-down direction result.

21 Claims, 7 Drawing Sheets

METHOD, SYSTEM, AND NEURAL NETWORK FOR IDENTIFYING DIRECTION OF A DOCUMENT

CROSS-REFERENCE TO RELATED APPLICATIONS

This application claims the priority of Chinese Patent Application No. 201710060219.4 entitled "A METHOD, A SYSTEM AND A NEURAL NETWORK FOR IDENTIFYING A DIRECTION OF A DOCUMENT" filed with the Chinese Patent Office on Jan. 24, 2017, which is incorporated herein by reference in its entirety.

BACKGROUND

1. Field

The present disclosure relates generally to a method, system, and neural network for identifying a direction of a document.

2. Description of the Related Art

Figure 1:
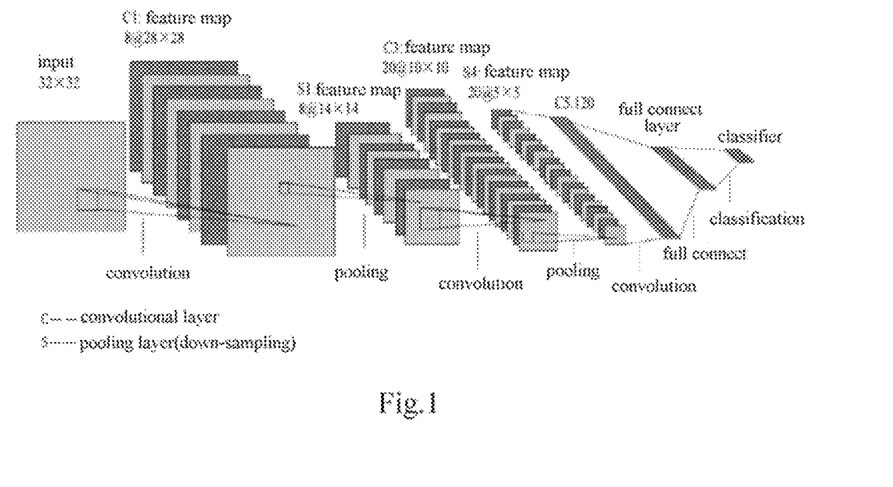
FIG. 1 shows a schematic view of a structure of a typical convolutional neural network in the prior art.

With the rising of depth learning technology, convolutional neural networks have been applied more and more in tasks such as image detection, classification and the like, with image direction discrimination also being included therein. A convolutional neural network is a multilayer neural network, with each layer comprising a plurality of two-dimensional planes, and with each plane comprising a plurality of independent neurons. At present, there are many variants of convolutional neural network architecture, but their basic structures are very similar, and the basic structure of the convolutional neural network comprises three layers, i.e., a convolutional layer, a pooling layer (also referred to as a down-sampling layer) and a full connect layer. A convolutional neural network for mode classification generally uses a classifier, for example softmax, in the last layer. FIG. 1 shows a structure of a typical convolutional neural network in the prior art. As shown in FIG. 1, the typical convolutional neural network comprises an input layer, convolutional layers, pooling layers, a full connect layer, and a classifier.

The input layer is an object to be processed.

The convolutional layers aim to learn a feature representation of an input. As shown in FIG. 1, a convolutional layer comprises several feature maps. Each neuron of one feature map in the convolutional layer is connected with adjacent neurons in a previous layer, and such an area including the adjacent neurons is called a local perception field in the previous layer perceived by the neuron. To calculate a new feature map, an input feature map is first made a convolution with a learned convolution kernel (also referred to as a filter, a feature detector), and then a result of the convolution is delivered to a nonlinear activation function. A new feature map is obtained by applying various convolution kernels. It is noted that kernels for generating one feature map are the same (i.e., weight sharing). Such a weight sharing mode has advantages of, for example, making it possible to reduce the complexity of a system, making the neural network be more easily trained, etc. The activation function describes the nonlinearity of the convolutional neural network, and is very ideal for a multilayer network to detect nonlinear features. Typical activation functions include sigmoid, tan h and ReLU.

The pooling layers (also referred to as the down-sampling layers) aim to realize spatial invariance by lowering the resolution of feature maps. The pooling layer is generally located between two convolutional layers. A feature map of each pooling layer is connected with a feature map of a corresponding previous convolutional layer, so numbers of the feature maps thereof are the same. Typical pooling operations are average pooling and maximum pooling. By superimposing several convolutional and pooling layers, we can extract a more abstract feature representation.

Downstream of the several convolutional and pooling layers, there are usually one or more full connect layers. Each neuron in the full connect layers themselves is connected with all neurons in a previous layer, and no spatial information is saved in the full connect layers.

A classifier is connected downstream of the full connect layer. The classifier is generally composed of one multilayer perception.

The typical convolutional neural networks introduced above can directly input an original image for having avoided complicated preprocessing on an image, and thus have been applied widely. However, during image direction discrimination, if a common convolutional neural network is directly used, it will be difficult to achieve a better identification effect, wherein one important reason is that an identified sample contains a number of pictures which are so self-symmetric that direction identification is made impossible.

SUMMARY

A brief summary of the present disclosure is given below to provide a basic understanding of some aspects of the present disclosure. It should be understood that the summary is not an exhaustive summary of the present disclosure; it does not intend to define a key or important part of the present disclosure, nor does it intend to limit the scope of the present disclosure. The object of the summary is only to briefly present some concepts, which serves as a preamble of the Section "detailed description of the embodiments" that follows.

In view of the problems raised above, the present disclosure provides a method, a system, and a neural network for identifying a direction of a document. The method, system, and neural network for identifying a direction of a document can efficiently eliminate interference caused by self-symmetric texts in a direction discrimination task, thereby improving the overall precision of a system.

According to one aspect of the present disclosure, there is provided a method for identifying a direction of a document, comprising: extracting a text line in the document; calculating a first normal direction result indicative of the text line probably being in a normal direction and a first upside-down direction result indicative of the text line probably being in a direction upside-down with respect to the normal direction; calculating a second normal direction result indicative of the text line after being rotated by 180 degrees probably being in the normal direction and a second upside-down direction result indicative of the text line after being rotated by 180 degrees probably being in the direction upside-down with respect to the normal direction; and determining the direction of the document according to the first normal direction result and the first upside-down direction result as well as the second normal direction result and the second upside-down direction result.

According to another aspect of the present disclosure, there is provided a system for identifying a direction of a document, comprising: an extracting device which extracts a text line in the document; a first calculating device which is connected to the extracting device and calculates a first normal direction result indicative of the text line probably being in a normal direction and a first upside-down direction result indicative of the text line probably being in a direction upside-down with respect to the normal direction; a second calculating device which is connected to the extracting device and calculates a second normal direction result indicative of the text line after being rotated by 180 degrees probably being in the normal direction and a second upside-down direction result indicative of the text line after being rotated by 180 degrees probably being in the direction upside-down with respect to the normal direction; and a determining device connecting with the first calculating device and the second calculating device, which determines the direction of the document according to the first normal direction result and the first upside-down direction result as well as the second normal direction result and the second upside-down direction result.

According to still another aspect of the present disclosure, there is provided a neural network for identifying a direction of a document, comprising: an inputting part which extracts a text line from the document and inputs the text line to a convolutional neural network and an extended convolutional neural network; the convolutional neural network which calculates a first normal direction result indicative of the text line probably being in a normal direction and a first upside-down direction result indicative of the text line probably being in a direction upside-down with respect to the normal direction; the extended convolutional neural network which calculates a second normal direction result indicative of the text line after being rotated by 180 degrees probably being in the normal direction and a second upside-down direction result indicative of the text line after being rotated by 180 degrees probably being in the direction upside-down with respect to the normal direction; and an outputting part which determines the direction of the document according to the first normal direction result and the first upside-down direction result as well as the second normal direction result and the second upside-down direction result and outputs the determined result.

According to yet another aspect of the present disclosure, there is provided a storage medium comprising a machine-readable program code that, when executed on an information processing system, causes the information processing system to implement the aforesaid method according to the present disclosure.

According to yet another aspect of the present disclosure, there is provided a program comprising machine-executable instructions that, when executed on an information processing system, cause the information processing system to implement the aforesaid method according to the present disclosure.

These and other advantages of the present disclosure will become more apparent from the following detailed descriptions of best embodiments of the present disclosure combined with the appended drawings.

BRIEF DESCRIPTION OF THE DRAWINGS

The above features and advantages of the present disclosure will be understood more easily by reading embodiments of the present disclosure with reference to the appended drawings. The figures described herein are only for the purpose of illustratively describing the embodiments of the present disclosure, but are not all possible implementations, and do not aim to limit the scope of the present disclosure. In the appended drawings.

DETAILED DESCRIPTION

Embodiments of the present disclosure will be described in detail combined with the appended drawings below. It should be noted that the following descriptions are only exemplary but do not aim to limit the present disclosure. In addition, in the following descriptions, same reference signs will be used to represent same or similar components in different figures. Different features in different embodiments described below may be combined with each other, to form other embodiments within the scope of the present disclosure.

Figure 2:
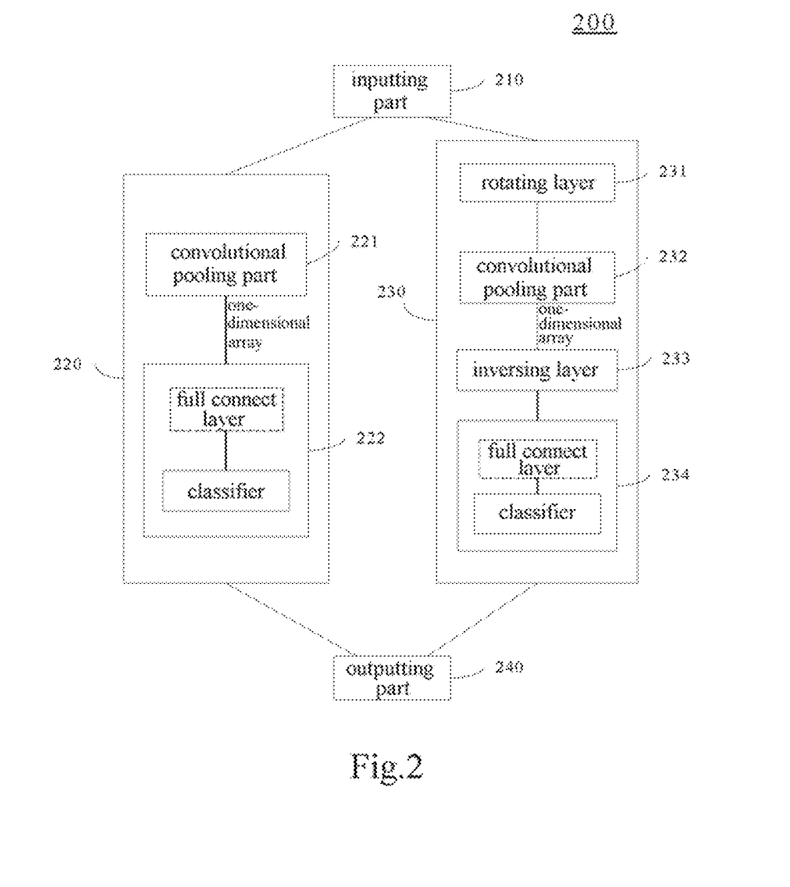
FIG. 2 shows a schematic view of a neural network for identifying a direction of a document according to an embodiment of the present disclosure.

Hereinafter, a neural network 200 for identifying a direction of a document according to an embodiment of the present disclosure will be described with reference to FIG. 2. As shown in FIG. 2, the neural network 200 comprises an inputting part 210, a convolutional neural network 220, an extended convolutional neural network 230, and an outputting part 240.

The inputting part 210 is used for extracting a text line image block from a document image inputted and respectively inputting the same to the convolutional neural network 220 and the extended convolutional neural network 230.

The convolutional neural network 220 is used for calculating a first normal direction result indicative of the text line probably being in a normal direction and a first upside-down direction result indicative of the text line probably being in a direction upside-down with respect to the normal direction. The structure of the convolutional neural network 220 is well-known, and includes a convolutional pooling part 221 and a classifying part 222.

Specifically, the convolutional pooling part 221 performs convolution processing and pooling processing on a text line to obtain a one-dimensional array. The convolutional pooling part 221 generally adopts a structure formed by superimposing several convolutional layers and pooling layers, with a pooling layer being located between two convolutional layers, and numbers of the convolutional layer and the pooling layer are determined according to practical requirements. The convolutional layer is used for extracting a feature representation of the text line, and includes several feature maps. The pooling layer is used for lowering the resolution of the feature maps.

The classifying part 222 is located downstream of the convolutional pooling part 221, for performing classification processing on the one-dimensional array from the convolutional pooling part 221, to output a probability indicative of the text line probably being in the normal direction as the first normal direction result, and a probability indicative of the text line probably being in the direction upside-down with respect to the normal direction as the first upside-down direction result. The classifying part 222 comprises a classifier, the classifier is generally composed of one multilayer perception, and conventional classifiers are such as a softmax classifier.

Preferably, the classifying part 222 further comprises a full connect layer, and the full connect layer performs feature extraction by connecting all neurons in the last layer of the convolutional pooling part 221 with each neuron in the full connect layer itself and outputs an extracted feature array to the classifier.

Referring to FIG. 2, the extended convolutional neural network 230 comprises a rotating layer 231, a convolutional pooling part 232, an inversing layer 233 and a classifying part 234. The extended convolutional neural network 230 is used for calculating a second normal direction result indicative of the text line after being rotated by 180 degrees probably being in the normal direction and a second upside-down direction result indicative of the text line after being rotated by 180 degrees probably being in the direction upside-down with respect to the normal direction.

The extended convolutional neural network 230 according to the embodiment of the present disclosure is obtained by inserting the rotating layer 231 and the inversing layer 233 in the convolutional neural network 220 described above, so both configurations and parameters of the convolutional pooling part 232 and the classifying part 234 in the extended convolutional neural network 230 are the same as configurations and parameters of the convolutional pooling part 221 and the classifying part 222 in the convolutional neural network. Besides, when training the neural network 200 according to the embodiment of the present disclosure, it is possible to only train the convolutional neural network 220.

Specifically, the rotating layer 231 receives a text line from the inputting part, rotates the text line by 180 degrees and then outputs the rotated text line to the convolutional pooling part 232.

The convolutional pooling part 232 performs convolution processing and pooling processing on the rotated text line to obtain a one-dimensional array. The convolutional pooling part 232 comprises a structure formed by superimposing several convolutional layers and pooling layers, with a pooling layer being located between two convolutional layers, and numbers of the convolutional layer and the pooling layer are determined according to practical requirements. The convolutional layer is used for extracting a feature representation of a text line image block, and includes several feature maps. The pooling layer is used for lowering the resolution of the feature maps.

The inversing layer 233 is used for inversing orders of respective elements in the one-dimensional array from the convolutional pooling part 232.

The classifying part 234 is located downstream of the inversing layer 233, for performing classification processing on the inversed one-dimensional array outputted from the inversing layer 233, to output a probability indicative of the text line probably being in the normal direction as the second normal direction result, and a probability indicative of the text line probably being in the direction upside-down with reference to the normal direction as the second upside-down direction result. The classifying part 234 comprises a classifier, the classifier is generally composed of one multilayer perception, and conventional classifiers are such as a softmax classifier.

Preferably, the classifying part 234 further comprises a full connect layer, and the full connect layer performs feature extraction by connecting all outputs of the inversing layer 233 with each neuron in the full connection layer itself and outputs an extracted feature array to the classifier.

The outputting part 240 is connected to the convolutional neural network 220 and the extended convolutional neural network 230. The outputting part 240 determines the direction of the document according to the first normal direction result and the first upside-down direction result from the convolutional neural network as well as the second normal direction result and the second upside-down direction result from the extended convolutional neural network.

Specifically, in the embodiment according to the present disclosure, the outputting part 240 adds the first normal direction result and the second upside-down direction result as a normal direction confidence and adds the first upside-down direction result and the second normal direction result as a upside-down direction confidence, and then, the outputting part 240 determines the direction of the document according to the normal direction confidence and the upside-down direction confidence. For example, when the normal direction confidence is greater than the upside-down direction confidence, the outputting part 240 determines the direction of the document as being a normal direction. Otherwise, when the normal direction confidence is less than the upside-down direction confidence, the outputting part 240 determines the direction of the document as being the direction upside-down with respect to the normal direction. If the normal direction confidence is right equal to the upside-down direction confidence, the inputting part 210 is made to extract a text image block in other portions of the document to perform identification of the direction of the document.

Hereinafter, an example of identifying a direction of a document using the neural network according to the embodiment of the present disclosure will be described with reference to FIG. 3.

Figure 3:
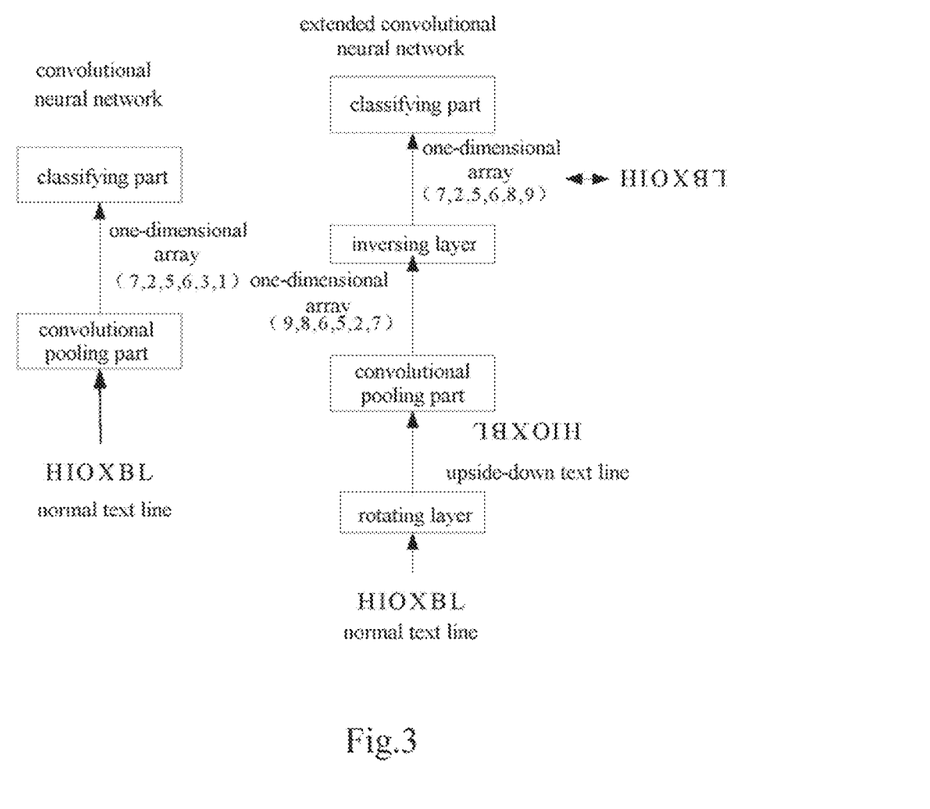
FIG. 3 shows an example of identifying a direction of a document by applying the neural network according to the embodiment of the present disclosure.

As shown in FIG. 3, a text line "HIOXBL" is respectively inputted to the convolutional neural network and the extended convolutional neural network. The convolutional pooling part in the convolutional neural network performs processing on the text line, to obtain a one-dimensional array "(7, 2, 5, 6, 3, 1)". The one-dimensional array is inputted to the classifying part in the convolutional neural network, to be subjected to classification processing, and a first normal direction result indicative of the text line probably being in a normal direction and a first upside-down direction result indicative of the text line probably being in a direction upside-down with respect to the normal direction are outputted.

In the extended convolutional neural network, firstly, the rotating layer rotates the inputted text line "HIOXBL" by 180°, to obtain an upside-down text line "⅂ꓭXOIH". Then, the convolutional pooling part performs convolution processing and pooling processing on the upside-down text line, and outputs a one-dimensional array "(9, 8, 6, 5, 2, 7)". Next, the inversing layer inverses orders of respective elements in the one-dimensional array outputted from the convolutional pooling part, to obtain a one-dimensional array "(7, 2, 5, 6, 8, 9)". Finally, the classifying part performs processing on the inversed one-dimensional array to output a second normal direction result indicative of the text line probably being in the normal direction and a second upside-down direction result indicative of the text line probably being in the direction upside-down with respect to the normal direction.

As can be seen from the example in FIG. 3, as compared with the original text line "HIOXBL", the text line " 7HXOIH " having been rotated by the rotating layer has been changed in terms of both orientations and positions of respective letters. Thus, the one-dimensional array "(9, 8, 6, 5, 2, 7)" outputted from the convolutional pooling part 232 of the extended convolutional neural network 230 represents a feature of the text line " 7HXOIH " which has been changed in terms of both directions and positions. In the inversing layer, orders of respective elements in the one-dimensional array "(9, 8, 6, 5, 2, 7)" are inversed, to obtain a one-dimensional array (7, 2, 5, 6, 8, 9). The array (7, 2, 5, 6, 8, 9) having been subjected to the inversing of orders is equivalent to a representation of a feature of the text line " 7HXOIH ". As compared with the text line "HIOXBL" before rotation, the respective elements in the text line " 7HXOIH " have been changed only in terms of orientations, but not in terms of positions. Accordingly, a classification result outputted from the extended convolutional neural network 230 is equivalent to a classification result of the text line in which the respective elements are respectively rotated by 180 degrees while positions among the respective elements are not changed, compared with the inputted text line. In this way, in the outputting part 240, the first normal direction result and the first upside-down direction result representing the direction of the text line having not been rotated which are outputted from the convolutional neural network can be added respectively to the second upside-down direction result and the second normal direction result representing the direction of the text line in which the respective elements are respectively rotated by 180 degrees while positions among the respective elements are not changed, which are respectively outputted from the extended convolutional neural network, so as to eliminate influences produced by self-symmetric elements upon direction discrimination of the text line, thus making it possible to more accurately determine the direction of the document.

In addition, in the embodiment according to the present disclosure, the direction of the document is determined by adding the rotating layer and the inversing layer in the convolutional neural network, instead of extracting the respective elements from the text line and rotating the respective elements by 180 degrees and then inputting the rotated elements to the convolutional neural network, thus greatly reducing the complexity of the neural network 200 and improving the efficiency of identification of the direction of the document.

Figure 4:
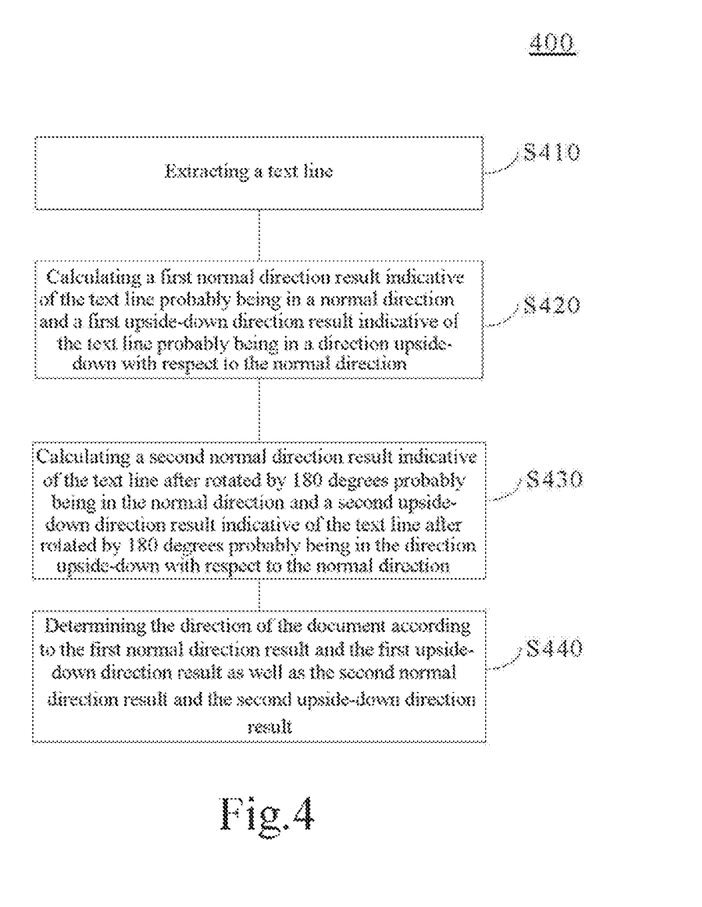
FIG. 4 shows a flowchart of a method for identifying a direction of a document according to an embodiment of the present disclosure.

Hereinafter, a method for identifying a direction of a document according to an embodiment of the present disclosure will be described with reference to FIG. 4.

The method for identifying a direction of a document according to the embodiment of the present disclosure comprises: an extracting step S410 of extracting a text line image block from an inputted document image; a first calculating step S420 of calculating a first normal direction result indicative of the text line probably being in a normal direction and a first upside-down direction result indicative of the text line probably being in a direction upside-down with respect to the normal direction; a second calculating step S430 of calculating a second normal direction result indicative of the text line after being rotated by 180° probably being in the normal direction and a second upside-down direction result indicative of the text line after being rotated by 180° probably being in the direction upside-down with respect to the normal direction; and a determining step S440 of determining the direction of the document according to the first normal direction result and the first upside-down direction result as well as the second normal direction result and the second upside-down direction result, wherein an order of performing the first calculating step S420 and the second calculating step S430 is not particularly limited. For example, it is possible to perform the first calculating step S420 and the second calculating step S430 in parallel, or to perform the first calculating step S420 first and then perform the second calculating step S430, or to perform the second calculating step S430 first and then perform the first calculating step S420.

In the first calculating step S420, a first normal direction result indicative of the text line probably being in a normal direction and a first upside-down direction result indicative of the text line probably being in a direction upside-down with respect to the normal direction are calculated using the convolutional neural network. The convolutional neural network comprises a convolutional pooling part having a structure formed by superimposing several convolutional layers and pooling layers and a classifying part, and the first calculating step S420 comprises: performing convolution processing and pooling processing on the text line by the convolutional pooling part of the convolutional neural network to obtain a one-dimensional array; and performing classification processing on the one-dimensional array by the classifying part of the convolutional neural network, to output a probability indicative of the text line probably being in the normal direction as the first normal direction result, and a probability indicative of the text line probably being in the direction upside-down with respect to the normal direction as the first upside-down direction result.

Figure 5:
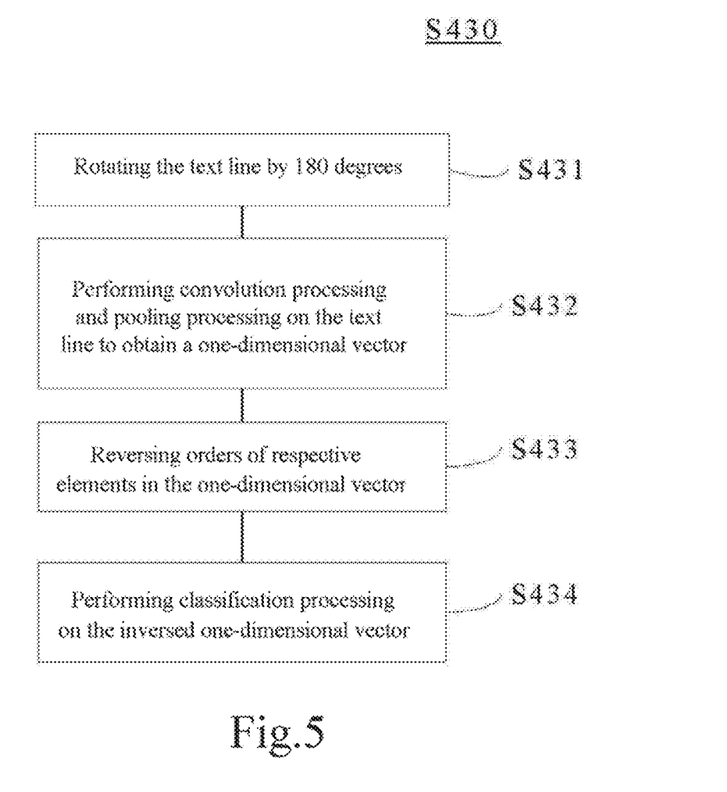
FIG. 5 shows a flowchart of a second calculation step in the method for identifying a direction of a document according to the embodiment of the present disclosure.

In the second calculating step S430, the second normal direction result indicative of the text line after being rotated by 180 degrees probably being in the normal direction and the second upside-down direction result indicative of the text line after being rotated by 180 degrees probably being in the direction upside-down with respect to the normal direction are calculated using the extended convolutional neural network described above which comprises a rotating layer, a convolutional pooling part having a structure formed by superimposing several convolutional layers and pooling layers, an inversing layer and a classifying part. FIG. 5 shows a flowchart of the second calculating step. As shown in FIG. 5, in a step S431, the text line is rotated by 180 degrees by the rotating layer; in a step S432, convolution processing and pooling processing are performed on the rotated text line by the convolutional pooling part of the extended convolutional neural network to obtain a one-dimensional array; in a step S433, orders of respective elements in the one-dimensional array are inversed by the inversing layer; and in a step S434, classification processing is performed on the inversed one-dimensional array by the classifying part of the extended convolutional neural network, to output a probability indicative of the text line probably being in the normal direction as the second normal direction result, and a probability indicative of the text line probably being in the direction upside-down with respect to the normal direction as the second upside-down direction result.

Hereinafter, a document direction identification system 600 for identifying a direction of a document according to an embodiment of the present disclosure will be described with reference to FIG. 6.

Figure 6:
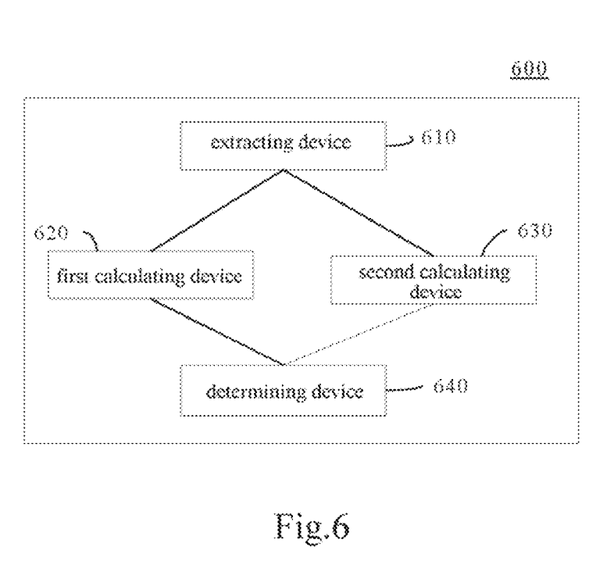
FIG. 6 shows a schematic view of a construction of a system for identifying a direction of a document according to an embodiment of the present disclosure.

As shown in FIG. 6, the document direction identification system 600 comprises an extracting device 610, a first calculating device 620, a second calculating device 630 and a determining device 640.

The extracting device 610 is connected with the first calculating device 620 and the second calculating device 630, and is used for extracting a text line image block from an inputted document image and inputting the same to the first calculating device 620 and the second calculating device 630.

The first calculating device 620 calculates a first normal direction result indicative of the text line probably being in a normal direction and a first upside-down direction result indicative of the text line probably being in a direction upside-down with respect to the normal direction using a convolutional neural network.

The second calculating device 630 calculates a second normal direction result indicative of the text line after being rotated by 180 degrees probably being in the normal direction and a second upside-down direction result indicative of the text line after being rotated by 180 degrees probably being in the direction upside-down with respect to the normal direction using an extended convolutional neural network described above. As stated above, the extended convolutional neural network is obtained by inserting the rotating layer and the inversing layer in the convolutional neural network, and comprises a rotating layer 231, a convolutional pooling part 232, an inversing layer 233 and a classifying part 234.

Figure 7:
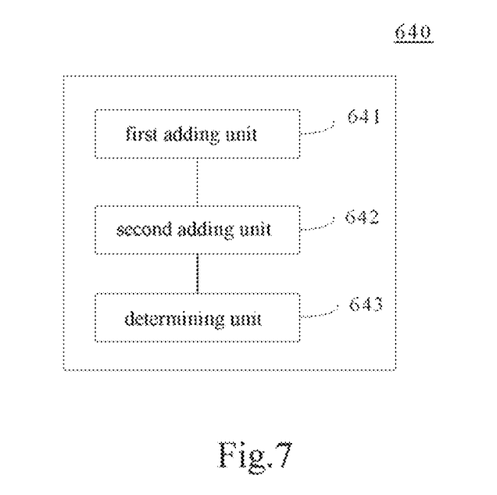
FIG. 7 shows a schematic view of a construction of a determining device in the system for identifying a direction of a document according to the embodiment of the present disclosure.

The determining device 640 is connected with the first calculating device 620 and the second calculating device 630, and determines the direction of the document according to the first normal direction result and the first upside-down direction result as well as the second normal direction result and the second upside-down direction result. FIG. 7 shows a schematic view of a construction of the determining device 640 according to the embodiment of the present disclosure. As shown in FIG. 7, the determining device 640 comprises a first adding unit 641, a second adding unit 642 and a determining unit 643, wherein the first adding unit 641 adds the first normal direction result from the convolutional neural network and the second upside-down direction result from the extended convolutional neural network as a normal direction confidence, the second adding unit 642 adds the first upside-down direction result from the convolutional neural network and the second normal direction result from the extended convolutional neural network as a upside-down direction confidence, and the determining unit 643 determines the direction of the document according to the normal direction confidence and the upside-down direction confidence.

In addition, it should also be noted herein that the respective composite parts in the above system can be configured by software, firmware, hardwire or a combination thereof. Specific means or manners that can be used for the configuration will not be stated repeatedly herein since they are well-known to those skilled in the art. In case of implementation by software or firmware, programs constituting the software are installed from a storage medium or a network to a computer (e.g. the universal computer 800 as shown in FIG. 8) having a dedicated hardware structure; the computer, when installed with various programs, can implement various functions and the like.

Figure 8:
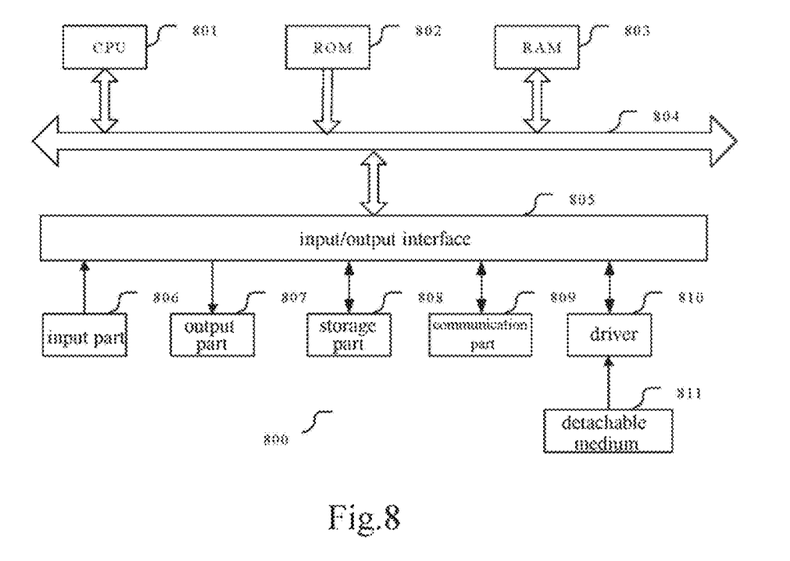
FIG. 8 shows a schematic block diagram of a computer for implementing the method and the system according to the embodiments of the present disclosure.

FIG. 8 shows a schematic block diagram of a computer that can be used for implementing the method and the system according to the embodiments of the present disclosure.

In FIG. 8, a central processing unit (CPU) 801 executes various processing according to a program stored in a read-only memory (ROM) 802 or a program loaded from a storage part 808 to a random access memory (RAM) 803. In the RAM 803, data needed at the time of execution of various processing and the like by the CPU 801 is also stored according to requirements. The CPU 801, the ROM 802 and the RAM 803 are connected to each other via a bus 804. An input/output interface 805 is also connected to the bus 804.

The following components are connected to the input/output interface 805: an input part 806 (including a keyboard, a mouse and the like); an output part 807 (including a display, such as a Cathode Ray Tube (CRT), a Liquid Crystal Display (LCD) and the like, as well as a loudspeaker and the like); the storage part 808 (including a hard disc and the like); and a communication part 809 (including a network interface card such as an LAN card, a modem and so on). The communication part 809 performs communication processing via a network such as the Internet. According to requirements, a driver 810 may also be connected to the input/output interface 805. A detachable medium 811 such as a magnetic disc, an optical disc, a magnetic optical disc, a semiconductor memory and the like may be installed on the driver 810 according to requirements, such that a computer program read therefrom is installed in the storage part 808 according to requirements.

In the case of carrying out the foregoing series of processing by software, programs constituting the software are installed from a network such as the Internet or a storage medium such as the detachable medium 811.

Those skilled in the art should appreciate that such a storage medium is not limited to the detachable medium 811 storing therein a program and distributed separately from the apparatus to provide the program to a user as shown in FIG. 8. Examples of the detachable medium 811 include a magnetic disc (including floppy disc (registered trademark)), a compact disc (including compact disc read-only memory (CD-ROM) and digital versatile disc (DVD), a magneto optical disc (including mini disc (MD)(registered trademark)), and a semiconductor memory. Or, the storage medium may be hard discs and the like included in the ROM 802 and the storage part 808 in which programs are stored, and are distributed concurrently with the apparatus including them to users.

The present disclosure further proposes a program product storing therein a machine-readable instruction code that, when read and executed by a machine, can implement the aforesaid method according to the embodiment of the present disclosure.

Correspondingly, a storage medium for carrying the program product storing therein the machine-readable instruction code is also included in the disclosure of the present disclosure. The storage medium includes but is not limited to a floppy disc, an optical disc, a magnetic optical disc, a memory card, a memory stick and the like.

It should be noted that, the method according to the present disclosure is not limited to be performed in the temporal order as described in the description, but may also be performed sequentially, in parallel or independently in other orders. Thus, the order of implementing the method as described in the description does not constitute a limitation to the technical scope of the present disclosure.

The foregoing descriptions of the embodiments of the present disclosure are for the purpose of better understanding the present disclosure, and they are only exemplary but do not aim to limit the present disclosure. It should be noted that in the foregoing descriptions, features described and/or shown for one embodiment may be used in one or more other embodiments according to an identical or similar way, be combined with features in other embodiments, or substitute features in other embodiments. Those skilled in the art could understand that without departing from the inventive concept of the present disclosure, all the various changes and modifications carried out for the embodiments described above fall within the scope of the present disclosure.

In conclusion, in the embodiments of the present disclosure, the present disclosure provides the following technical solutions:

Solution 1: A method for identifying a direction of a document, comprising:
extracting a text line in the document;
calculating a first normal direction result indicative of the text line probably being in a normal direction and a first upside-down direction result indicative of the text line probably being in a direction upside-down with respect to the normal direction;
calculating a second normal direction result indicative of the text line after being rotated by 180 degrees probably being in the normal direction and a second upside-down direction result indicative of the text line after being rotated by 180 degrees probably being in the direction upside-down with respect to the normal direction; and
determining the direction of the document according to the first normal direction result and the first upside-down direction result as well as the second normal direction result and the second upside-down direction result.

Solution 2: The method according to Solution 1, wherein the first normal direction result indicative of the text line probably being in a normal direction and the first upside-down direction result indicative of the text line probably being in a direction upside-down with respect to the normal direction are calculated using a convolutional neural network.

Solution 3: The method according to Solution 2, wherein the convolutional neural network comprises a convolutional pooling part having a structure formed by superimposing several convolutional layers and pooling layers and a classifying part, and the calculating a first normal direction result indicative of the text line probably being in a normal direction and a first upside-down direction result indicative of the text line probably being in a direction upside-down with respect to the normal direction comprises:
performing convolution processing and pooling processing on the text line by the convolutional pooling part of the convolutional neural network to obtain a one-dimensional array; and
performing classification processing on the one-dimensional array by the classifying part of the convolutional neural network, to output a probability indicative of the text line probably being in a normal direction as the first normal direction result, and a probability indicative of the text line probably being in the direction upside-down with respect to the normal direction as the first upside-down direction result.

Solution 4: The method according to Solution 3, wherein the second normal direction result indicative of the text line after being rotated by 180 degrees probably being in the normal direction and the second upside-down direction result indicative of the text line after being rotated by 180 degrees probably being in the direction upside-down with respect to the normal direction are calculated using an extended convolutional neural network which comprises a rotating layer, a convolutional pooling part having a structure formed by superimposing several convolutional layers and pooling layers, an inversing layer and a classifying part, comprising:
rotating the text line by 180 degrees by the rotating layer;
performing convolution processing and pooling processing on a rotated text line by the convolutional pooling part of the extended convolutional neural network to obtain a one-dimensional array;
inversing orders of respective elements in the one-dimensional array by the inversing layer; and
performing classification processing on the inversed one-dimensional array by the classifying part of the extended convolutional neural network, to output a probability indicative of the text line probably being in the normal direction as the second normal direction result, and a probability indicative of the text line probably being in the direction upside-down with respect to the normal direction as the second upside-down direction result.

Solution 5: The method according to Solution 4, wherein the determining the direction of the document according to the first normal direction result and the first upside-down direction result as well as the second normal direction result and the second upside-down direction result comprises:
adding the first normal direction result and the second upside-down direction result as a normal direction confidence;
adding the first upside-down direction result and the second normal direction result, as a upside-down direction confidence; and
determining the direction of the document according to the normal direction confidence and the upside-down direction confidence.

Solution 6: The method according to Solution 4 or 5, wherein the extended convolutional neural network is obtained by inserting the rotating layer and the inversing layer in the convolutional neural network.

Solution 7: The method according to Solution 6, wherein only the convolutional neural network shall be trained.

Solution 8: The method according to Solution 6, wherein the classifying part of the convolutional neural network comprises a classifier which performs classification processing.

Solution 9: The method according to Solution 8, wherein the classifier is a softmax classifier.

Solution 10: A system for identifying a direction of a document, comprising:
an extracting device which extracts a text line in the document;
a first calculating device which is connected to the extracting device and calculates a first normal direction result indicative of the text line probably being in a normal direction and a first upside-down direction result indicative of the text line probably being in a direction upside-down with respect to the normal direction;
a second calculating device which is connected to the extracting device and calculates a second normal direction result indicative of the text line after being rotated by 180 degrees probably being in the normal direction and a second upside-down direction result indicative of the text line after being rotated by 180 degrees probably being in the direction upside-down with respect to the normal direction; and a determining device connected to the first calculating device and the second calculating device, which determines the direction of the document according to the first normal direction result and the first upside-down direction result as well as the second normal direction result and the second upside-down direction result.

Solution 11: The system according to Solution 10, wherein the first calculating device calculates a first normal direction result indicative of the text line probably being in a normal direction and a first upside-down direction result indicative of the text line probably being in a direction upside-down with respect to the normal direction using a convolutional neural network.

Solution 12: The system according to Solution 11, wherein the convolutional neural network comprises:
a convolutional pooling part which has a structure formed by superimposing several convolutional layers and pooling layers and performs convolution processing and pooling processing on the text line to obtain a one-dimensional array; and
a classifying part which performs classification processing on the one-dimensional array, to output a probability indicative of the text line probably being in the normal direction as the first normal direction result, and a probability indicative of the text line probably being in the direction upside-down with respect to the normal direction as the first upside-down direction result.

Solution 13: The system according to Solution 12, wherein the second calculating device calculates a second normal direction result indicative of the text line after being rotated by 180 degrees probably being in the normal direction and a second upside-down direction result indicative of the text line after being rotated by 180 degrees probably being in the direction upside-down with respect to the normal direction using an extended convolutional neural network, the extended convolutional neural network comprising:
a rotating layer which rotates the text line by 180 degrees;
a convolutional pooling part which has a structure formed by superimposing several convolutional layers and pooling layers and performs convolution processing and pooling processing on a rotated text line to obtain a one-dimensional array; and
an inversing layer which inverses orders of respective elements in the one-dimensional array; and
a classifying part which performs classification processing on the inversed one-dimensional array to output a probability indicative of the text line probably being in the normal direction as the second normal direction result, and a probability indicative of the text line probably being in the direction upside-down with respect to the normal direction as the second upside-down direction result.

Solution 14: The system according to Solution 13, wherein, the extended convolutional neural network is obtained by inserting the rotating layer and the inversing layer in the convolutional neural network.

Solution 15: The system according to Solution 14, wherein, the determining device comprises:
a first adding unit which adds the first normal direction result and the second upside-down direction result, as a normal direction confidence;
a second adding unit which adds the first upside-down direction result and the second normal direction result, as a upside-down direction confidence; and
a determining unit which determines the direction of the document according to the normal direction confidence and the upside-down direction confidence.

Solution 16: A neural network for identifying a direction of a document, comprising:
an inputting part which extracts a text line from the document and inputs the text line to a convolutional neural network and an extended convolutional neural network;
the convolutional neural network which calculates a first normal direction result indicative of the text line probably being in a normal direction and a first upside-down direction result indicative of the text line probably being in a direction upside-down with respect to the normal direction;
the extended convolutional neural network which calculates a second normal direction result indicative of the text line after being rotated by 180 degrees probably being in the normal direction and a second upside-down direction result indicative of the text line after being rotated by 180 degrees probably being in the direction upside-down with respect to the normal direction; and
an outputting part which determines the direction of the document according to the first normal direction result and the first upside-down direction result as well as the second normal direction result and the second upside-down direction result and outputs the determined result.

Solution 17: The neural network according to Solution 16, wherein, the convolutional neural network comprises:
a convolutional pooling part which has a structure formed by superimposing several convolutional layers and pooling layers and performs convolution processing and pooling processing on the text line to obtain a one-dimensional array; and
a classifying part which performs classification processing on the one-dimensional array, to output a probability indicative of the text line probably being in the normal direction as the first normal direction result, and a probability indicative of the text line probably being in the direction upside-down with respect to the normal direction as the first upside-down direction result.

Solution 18: The neural network according to Solution 17, wherein, the extended convolutional neural network comprises:
a rotating layer which rotates the text line by 180 degrees;
a convolutional pooling part which has a structure formed by superimposing several convolutional layers and pooling layers and performs convolution processing and pooling processing on a rotated text line to obtain a one-dimensional array; and
an inversing layer which inverses orders of respective elements in the one-dimensional array; and
a classifying part which performs classification processing on the inversed one-dimensional array to output a probability indicative of the text line probably being in the normal direction as the second normal direction result, and a probability indicative of the text line probably being in the direction upside-down with respect to the normal direction as the second upside-down direction result.

Solution 19: The neural network according to Solution 18, wherein, the extended convolutional neural network is obtained by inserting the rotating layer and the inversing layer in the convolutional neural network.

Solution 20: The neural network according to Solution 19, wherein, the outputting part comprises:
a first adding unit which adds the first normal direction result and the second upside-down direction result, as a normal direction confidence;
a second adding unit which adds the first upside-down direction result and the second normal direction result, as a upside-down direction confidence; and a determining unit which determines the direction of the document according to the normal direction confidence and the upside-down direction confidence.

What is claimed is:

1. A method for identifying a direction of a document, comprising:
    extracting a text line in the document;
    calculating a first normal direction result indicative of a first probability that the text line is in a normal direction and a first upside-down direction result indicative of a second probability that the text line is in a direction upside-down with respect to the normal direction;
    calculating a second normal direction result indicative of a third probability that the text line after being rotated by 180 degrees is in the normal direction and a second upside-down direction result indicative of a fourth probability that the text line after being rotated by 180 degrees is in the direction upside-down with respect to the normal direction; and
    determining the direction of the document according to the first normal direction result and the first upside-down direction result as well as the second normal direction result and the second upside-down direction result.

2. The method according to claim 1, wherein the first normal direction result indicative of the first probability that the text line is in a normal direction and the first upside-down direction result indicative of the second probability that the text line is in a direction upside-down with respect to the normal direction are calculated using a convolutional neural network.

3. The method according to claim 2, wherein the convolutional neural network comprises a convolutional pooling part having a structure formed by superimposing several convolutional layers and pooling layers and a classifying part, and
    wherein the calculating of the first normal direction result indicative of the first probability that the text line in a normal direction and the first upside-down direction result indicative of the second probability that the text line is in a direction upside-down with respect to the normal direction comprises:
        performing convolution processing and pooling processing on the text line by the convolutional pooling part of the convolutional neural network to obtain a one-dimensional array; and
        performing classification processing on the one-dimensional array by the classifying part of the convolutional neural network, to output the first probability indicative of the text line being in a normal direction as the first normal direction result, and the second probability indicative of the text line being in the direction upside-down with respect to the normal direction as the first upside-down direction result.

4. The method according to claim 3, wherein the second normal direction result indicative of the third probability that the text line, after being rotated by 180 degrees, is in the normal direction and the second upside-down direction result indicative of the fourth probability that the text line, after being rotated by 180 degrees, is in the direction upside-down with respect to the normal direction are calculated using an extended convolutional neural network which comprises a rotating layer, a convolutional pooling part having a structure formed by superimposing several convolutional layers and pooling layers, an inversing layer and a classifying part, comprising:
    rotating the text line by 180 degrees by the rotating layer;
    performing convolution processing and pooling processing on a rotated text line by the convolutional pooling part of the extended convolutional neural network to obtain a one-dimensional array;
    inversing orders of respective elements in the one-dimensional array by the inversing layer; and
    performing classification processing on the inversed one-dimensional array by the classifying part of the extended convolutional neural network, to output the third probability indicative of the text line being in the normal direction as the second normal direction result, and the fourth probability indicative of the text line being in the direction upside-down with respect to the normal direction as the second upside-down direction result.

5. The method according to claim 4, wherein the determining the direction of the document according to the first normal direction result and the first upside-down direction result as well as the second normal direction result and the second upside-down direction result comprises:
    adding the first normal direction result and the second upside-down direction result, as a normal direction confidence;
    adding the first upside-down direction result and the second normal direction result, as a upside-down direction confidence; and
    determining the direction of the document according to the normal direction confidence and the upside-down direction confidence.

6. The method according to claim 5, wherein the extended convolutional neural network is obtained by inserting the rotating layer and the inversing layer in the convolutional neural network.

7. The method according to claim 6, wherein only the convolutional neural network shall be trained.

8. The method according to claim 6, wherein the classifying part of the convolutional neural network comprises a classifier which performs classification processing.

9. The method according to claim 8, wherein the classifier is a softmax classifier.

10. A system for identifying a direction of a document, comprising:
    an extracting device which extracts a text line in the document;
    a first calculating device which is connected to the extracting device and calculates a first normal direction result indicative of a first probability that the text line is in a normal direction and a first upside-down direction result indicative of a second probability that the text line is in a direction upside-down with respect to the normal direction;
    a second calculating device which is connected to the extracting device and calculates a second normal direction result indicative of a third probability that the text line after being rotated by 180 degrees is in the normal direction and a second upside-down direction result indicative of a fourth probability that the text line after being rotated by 180 degrees is in the direction upside-down with respect to the normal direction; and
    a determining device connected to the first calculating device and the second calculating device, which determines the direction of the document according to the first normal direction result and the first upside-down direction result as well as the second normal direction result and the second upside-down direction result.

11. The system according to claim 10, wherein the first calculating device calculates a first normal direction result indicative of the first probability that the text line is in a normal direction and a first upside-down direction result indicative of the second probability that the text line is in a direction upside-down with respect to the normal direction using a convolutional neural network.

12. The system according to claim 11, wherein the convolutional neural network comprises:
a convolutional pooling part which has a structure formed by superimposing several convolutional layers and pooling layers and performs convolution processing and pooling processing on the text line to obtain a one-dimensional array; and
a classifying part which performs classification processing on the one-dimensional array, to output the first probability indicative of the text line being in the normal direction as the first normal direction result, and the second probability indicative of the text line being in the direction upside-down with respect to the normal direction as the first upside-down direction result.

13. The system according to claim 12, wherein the second calculating device calculates the second normal direction result indicative of the third probability that the text line, after being rotated by 180 degrees, is in the normal direction and the second upside-down direction result indicative of the fourth probability that the text line, after being rotated by 180 degrees, is in the direction upside-down with respect to the normal direction using an extended convolutional neural network, the extended convolutional neural network comprising:
a rotating layer which rotates the text line by 180 degrees;
a convolutional pooling part which has a structure formed by superimposing several convolutional layers and pooling layers and performs convolution processing and pooling processing on a rotated text line to obtain a one-dimensional array; and
an inversing layer which inverses orders of respective elements in the one-dimensional array; and
a classifying part which performs classification processing on the inversed one-dimensional array to output the third probability indicative of the text line being in the normal direction as the second normal direction result, and the fourth probability indicative of the text line being in the direction upside-down with respect to the normal direction as the second upside-down direction result.

14. The system according to claim 13, wherein, the extended convolutional neural network is obtained by inserting the rotating layer and the inversing layer in the convolutional neural network.

15. The system according to claim 14, wherein, the determining device comprises:
a first adding unit which adds the first normal direction result and the second upside-down direction result, as a normal direction confidence;
a second adding unit which adds the first upside-down direction result and the second normal direction result, as a upside-down direction confidence; and
a determining unit which determines the direction of the document according to the normal direction confidence and the upside-down direction confidence.

16. A neural network for identifying a direction of a document, comprising:
an inputting part which extracts a text line from the document and inputs the text line to a convolutional neural network and an extended convolutional neural network;
the convolutional neural network which calculates a first normal direction result indicative of a first probability that the text line is in a normal direction and a first upside-down direction result indicative of a second probability that the text line is in a direction upside-down with respect to the normal direction;
the extended convolutional neural network which calculates a second normal direction result indicative of a third probability that the text line after being rotated by 180 degrees is in the normal direction and a second upside-down direction result indicative of a fourth probability that the text line after being rotated by 180 degrees is in the direction upside-down with respect to the normal direction; and
an outputting part which determines the direction of the document according to the first normal direction result and the first upside-down direction result as well as the second normal direction result and the second upside-down direction result and outputs the determined result.

17. The neural network according to claim 16, wherein the convolutional neural network comprises:
a convolutional pooling part which has a structure formed by superimposing several convolutional layers and pooling layers and performs convolution processing and pooling processing on the text line to obtain a one-dimensional array; and
a classifying part which performs classification processing on the one-dimensional array, to output the first probability indicative of the text line being in the normal direction as the first normal direction result, and the second probability indicative of the text line being in the direction upside-down with respect to the normal direction as the first upside-down direction result.

18. The neural network according to claim 17, wherein the extended convolutional neural network comprises:
a rotating layer which rotates the text line by 180 degrees;
a convolutional pooling part which has a structure formed by superimposing several convolutional layers and pooling layers and performs convolution processing and pooling processing on a rotated text line to obtain a one-dimensional array; and
an inversing layer which inverses orders of respective elements in the one-dimensional array; and
a classifying part which performs classification processing on the inversed one-dimensional array to output the third probability indicative of the text line being in the normal direction as the second normal direction result, and the fourth probability indicative of the text line being in the direction upside-down with respect to the normal direction as the second upside-down direction result.

19. The neural network according to claim 18, wherein the extended convolutional neural network is obtained by inserting the rotating layer and the inversing layer in the convolutional neural network.

20. The neural network according to claim 19, wherein, the outputting part comprises:
a first adding unit which adds the first normal direction result and the second upside-down direction result, as a normal direction confidence;
a second adding unit which adds the first upside-down direction result and the second normal direction result, as a upside-down direction confidence; and
a determining unit which determines the direction of the document according to the normal direction confidence and the upside-down direction confidence.

21. A non-transitory computer readable storage medium storing a program code that, when executed on an information processing system, causes the information processing system to implement the method according to claim 1.

* * * * *